(12) United States Patent
Kuenzner

(10) Patent No.: US 11,465,651 B2
(45) Date of Patent: Oct. 11, 2022

(54) ACTIVATION OF A DRIVING FUNCTION FOR AUTOMATED DRIVING WITH LONGITUDINAL AND TRANSVERSE GUIDANCE VIA A DIFFERENT DRIVING FUNCTION FOR AUTOMATED DRIVING WITH A LOW DEGREE OF AUTOMATION

(71) Applicant: Bayerische Motoren Werke Aktiengesellschaft, Munich (DE)

(72) Inventor: Hermann Kuenzner, Freising (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 151 days.

(21) Appl. No.: 17/050,087

(22) PCT Filed: Apr. 18, 2019

(86) PCT No.: PCT/DE2019/100364
§ 371 (c)(1),
(2) Date: Oct. 23, 2020

(87) PCT Pub. No.: WO2019/206376
PCT Pub. Date: Oct. 31, 2019

(65) Prior Publication Data
US 2021/0370935 A1    Dec. 2, 2021

(30) Foreign Application Priority Data
Apr. 25, 2018    (DE) .................... 10 2018 206 425.3

(51) Int. Cl.
*B60W 60/00*    (2020.01)
*B60W 30/14*    (2006.01)
(Continued)

(52) U.S. Cl.
CPC ...... *B60W 60/0051* (2020.02); *B60W 30/146* (2013.01); *B60W 30/16* (2013.01);
(Continued)

(58) Field of Classification Search
CPC .......... B60W 60/0051; B60W 30/146; B60W 30/16; B60W 50/082; B60W 2520/10;
(Continued)

(56) References Cited

U.S. PATENT DOCUMENTS 10,427,686 B2 * 10/2019 Mimura ............ B60W 50/0097
2015/0006013 A1    1/2015 Wimmer et al.
(Continued)

FOREIGN PATENT DOCUMENTS

DE    10 2012 002 304 A1    8/2013
DE    10 2015 225 932 A1    6/2017
(Continued)

OTHER PUBLICATIONS

International Search Report (PCT/ISA/210) issued in PCT Application No. PCT/DE2019/100364 dated Sep. 18, 2019 with English translation (four (4) pages).
(Continued)

*Primary Examiner* — Jason Holloway
(74) *Attorney, Agent, or Firm* — Crowell & Moring LLP

(57) ABSTRACT

A driving system for a motor vehicle includes a first driving function for automated driving with automated longitudinal and transverse guidance and a second driving function for automated driving with at least automated longitudinal guidance, or with at least automated transverse guidance. The second driving function has a lower degree of automation than the first driving function. The first driving function is available in a tolerance range. Starting from a driving state with an active second driving function and a value of the driving parameter outside the tolerance range, the driving system changes, when the second driving function is active, the value of the driving parameter in the direction of the tolerance range via automated longitudinal guidance or automated transverse guidance. The driving system then determines that the driving parameter satisfies a criterion with respect to the tolerance range.

13 Claims, 4 Drawing Sheets

(51) Int. Cl.
  *B60W 50/08* (2020.01)
  *B60W 30/16* (2020.01)
(52) U.S. Cl.
  CPC ....... *B60W 50/082* (2013.01); *B60W 2520/10* (2013.01); *B60W 2540/21* (2020.02); *B60W 2540/223* (2020.02); *B60W 2554/802* (2020.02); *B60W 2720/10* (2013.01); *B60W 2754/30* (2020.02)
(58) Field of Classification Search
  CPC ....... B60W 2540/21; B60W 2540/223; B60W 2554/802; B60W 2720/10; B60W 2754/30; B60W 2754/10; B60W 30/10; B60W 30/14
  See application file for complete search history.

(56) References Cited

U.S. PATENT DOCUMENTS

| | | | |
|---|---|---|---|
| 2016/0096531 A1* | 4/2016 | Hoye | B60W 50/14 701/1 |
| 2017/0186248 A1* | 6/2017 | Fournier | G05D 1/0088 |
| 2018/0029640 A1 | 2/2018 | Otto et al. | |
| 2018/0239352 A1* | 8/2018 | Wang | B60W 60/0053 |
| 2019/0171204 A1 | 6/2019 | Jang et al. | |
| 2020/0001893 A1 | 1/2020 | Limbacher | |
| 2020/0062278 A1 | 2/2020 | Kuenzner | |
| 2020/0377126 A1* | 12/2020 | Obata | B60W 60/0059 |
| 2021/0114659 A1* | 4/2021 | Miyashita | G05D 1/0061 |
| 2021/0237762 A1* | 8/2021 | Kuenzner | B60W 30/143 |

FOREIGN PATENT DOCUMENTS

| | | |
|---|---|---|
| DE | 10 2016 220 313 B3 | 3/2018 |
| DE | 10 2017 208 506 A1 | 11/2018 |
| EP | 2 930 081 A | 10/2015 |
| WO | WO 2018/029758 A1 | 2/2018 |

OTHER PUBLICATIONS

German-language Written Opinion (PCT/ISA/237) issued in PCT Application No. PCT/DE2019/100364 dated Sep. 18, 2019 (six (6) pages).

German-language Search Report issued in German Application No. DE 10 2018 206 425. 3 dated Oct. 29, 2019 partial with English translation (11 pages).

* cited by examiner

ACTIVATION OF A DRIVING FUNCTION FOR AUTOMATED DRIVING WITH LONGITUDINAL AND TRANSVERSE GUIDANCE VIA A DIFFERENT DRIVING FUNCTION FOR AUTOMATED DRIVING WITH A LOW DEGREE OF AUTOMATION

BACKGROUND AND SUMMARY OF THE INVENTION

The present subject matter relates to a driving system for a motor vehicle, such as a passenger vehicle, that supports a first driving function for automated driving with automated longitudinal and transverse guidance. The present subject matter further relates to a method for activating the first driving function.

The term "automated driving" in the context of the document may be understood to mean driving with automated longitudinal or transverse guidance or autonomous driving with automated longitudinal and transverse guidance. Automated driving involves, for example, driving on the freeway. The term "automated driving" comprises automated driving with any degree of automation. Example degrees of automation are assisted, partly automated, highly automated, or fully automated driving. These degrees of automation have been defined by the German Federal Highway Research Institute (BASt) (see BASt publication "Forschung kompakt" [Compact research], issued November 2012). In the case of assisted driving, the driver continuously performs longitudinal or transverse guidance while the system takes over the respective other function within certain limits. This includes, for example, adaptive cruise control (ACC). In the case of partly automated driving (TAF), the system takes over the longitudinal and transverse guidance for a certain duration and/or in specific situations, wherein the driver must continuously monitor the system as in the case of assisted driving. In the case of highly automated driving (HAF), the system takes over the longitudinal and transverse guidance for a certain duration without the driver having to continuously monitor the system; the driver must however be capable within a certain time of taking over vehicle guidance. In the case of fully automated driving (VAF), the system is able to automatically manage driving in all situations for a specific application case; a driver is then no longer required for this application case. The four degrees of automation mentioned above correspond to SAE Levels 1 to 4 of the SAE J3016 standard (SAE—Society of Automotive Engineering). By way of example, highly automated driving (HAF) corresponds to Level 3 of the SAE J3016 standard. SAE J3016 furthermore also provides SAE Level 5 as the highest degree of automation, this not being contained in the definition of the BASt. SAE Level 5 corresponds to driverless driving, in which the system can automatically manage all situations in the same way as a human driver throughout the entire journey; a driver is generally no longer required.

In a driving system with a driving function for highly automated driving (HAF), the driving function for highly automated driving is generally not available to be activated in all driving situations. The availability is instead linked to one or more driving parameter-specific conditions being met.

By way of example, there may be a requirement, in order for HAF to be able to be activated, for the driving speed to be in a certain speed range, for example, a speed range from 60 km/h to 130 km/h. This is due, for example, to technical restrictions (for example a limit of up to 60 km/h in the case of an HAF driving function for the essential application case of congestion or a limit of up to 130 km/h in the case of a freeway autopilot) or legal speed limits (for example a permitted maximum speed on a specific road section) or environmental restrictions such as poor vision.

In addition or as an alternative, there may be a requirement, in order for HAF to be able to be activated, for the distance from the vehicle in front to be great enough, such as greater than, or greater than or equal to a specific lower distance limit value.

In addition or as an alternative, there may be a requirement, in order for HAF to be able to be activated, for the transverse position of the vehicle in the traffic lane to be in a particular range such that the transverse position is reasonably central.

If the driver wishes to activate the driving function HAF, said driver often does not know whether the driving parameters, relevant to the activation, of the vehicle meet the respective conditions for the individual driving parameters to be able to activate the driving function HAF.

If, for example, the driver attempts to activate a driving function for highly automated driving by way of a corresponding control operation (for example actuating a button in the vehicle cockpit) at a speed greater than an upper limit speed, the driver receives, for example, feedback via a screen in the vehicle cockpit that he is only able to do this at a lower speed (for example "activation of HAF not possible, please drive slower"). After the driver has reduced the vehicle speed, the driver again must attempt to activate the HAF driving function through a control operation. If the driving speed has not been reduced to a sufficient extent, the driving speed possibly has to be further reduced until the driving speed is finally low enough for the HAF function to be able to be activated by the driver. This results in one or more unnecessary, unsuccessful control operations on the part of the driver to activate the HAF driving function, wherein the failed attempts may cause the driver to become frustrated.

Due to multiple driving parameter-specific conditions to be complied with in the attempt to activate the HAF driving function, there may also be a plurality of background reasons that then all must be overcome by the driver by adapting the manual driving mode (for example reducing the speed, increasing the distance from the vehicle in front, driving in the middle of the traffic lane). This is laborious and leads to interaction effort that could cause a distraction from the road scene.

The object of the present subject matter is therefore to specify an improved driving system with a driving function for automated driving and a method for activating a driving function for automated driving, in which driver convenience is improved when activating a driving function for automated driving, in particular for highly automated driving.

The object is achieved by the features of the independent patent claims. Advantageous embodiments are described in the dependent claims. It is pointed out that additional features of a patent claim dependent on an independent patent claim, without the features of the independent patent claim or only in combination with a subset of the features of the independent patent claim, may form a separate invention independent of the combination of all of the features of the independent patent claim, that may be made into the subject matter of an independent claim, a divisional application or a subsequent application. This applies analogously to the technical teaching described in the description, which teaching may form an invention independent of the features of the independent patent claims.

The present subject matter relates to a driving system for a motor vehicle with a first driving function (for example SAE Level 3=HAF or higher) for automated driving with automated longitudinal and transverse guidance and a second driving function for automated driving with at least automated longitudinal guidance (for example ACC or TAF) or with at least automated transverse guidance (for example lane keep assistant or TAF). The second driving function has a lower degree of automation than the first driving function. The first driving function is preferably a freeway autopilot for highly automated driving on the freeway.

The first driving function is available for activation in a permissibility range (defined by a lower and/or upper limit) for a driving parameter, for example, when the driving speed is in a speed range from 60 km/h to 130 km/h. The driving function is preferably able to be activated solely in this permissibility range. The activation of the first driving function may of course also be linked to whether a driving parameter (for example the distance from the vehicle in front in terms of time or length) other than the abovementioned driving parameter (for example the vehicle speed) is in a corresponding permissibility range (for example less than 3 s).

The permissibility range may have a lower and an upper limit or have just a lower or just an upper limit. The upper and/or lower limit may in this case be part of the permissibility range (for example a speed range of less than or equal to 130 km/h) or specifically no longer be part of the permissibility range (for example a speed range of less than 130 km/h).

The driving system is configured to perform various activities that are described below. This typically takes place by way of an electronic control unit, which may also be distributed over a plurality of controllers. The electronic control unit may comprise one or more computers having one or more processors coupled to memory that operates in the manner according to the present subject matter by executing software instructions stored in the memory.

Starting from a driving state with an active second driving function (for example active TAF driving function or active ACC driving function) and a value of the driving parameter outside the permissibility range (for example a current vehicle speed greater than the maximum permitted vehicle speed for activating an HAF driving function), when the second driving function is active, the driving system changes the value of the driving parameter in the direction of the permissibility range. This may take place by way of automated longitudinal guidance (for example in the case of a driving parameter in the form of the vehicle speed or of the distance from the vehicle in front in terms of time or length) or by way of automated transverse guidance (for example in the case of a driving parameter relating to the transverse position in the traffic lane). This also includes the fact that both the transverse guidance and the longitudinal guidance may be used to change the driving parameter. A speed controller for the second driving function attempts, for example, to reduce or to increase the vehicle speed (depending on the starting speed).

The driving system then establishes at some point that the driving parameter (for example the vehicle speed or the distance from the vehicle in front) meets a criterion with respect to the permissibility range. The criterion requires, for example, the driving parameter to be in the permissibility range. It would in theory also be conceivable for the criterion to be met even before the permissibility range is reached (for example starting from 5 km/h above the upper speed limit of a speed-related permissibility range). The criterion will however preferably be met only when the driving parameter is in the permissibility range.

The first driving function (for example HAF) is activated by the system after the driving parameter meets the criterion with respect to the permissibility range, for example, after the driving parameter reaches the permissibility range. The first driving function is activated in response to the permissibility range being reached. There may be provision for the first driving function to be activated automatically without the driver having to perform a further control operation. As an alternative, there may be provision for the activatability of the first driving function to be signaled to the driver (optically, acoustically, or haptically) after the driving parameter meets the criterion with respect to the permissibility range. The driver may then trigger the activation of the driving function through an additional control operation (for example actuating a control element, letting go of the steering wheel or uttering a voice command). The additional control operation is preferably a control operation able to be performed by the driver with little control effort as an initial control operation for activating the first driving function, which is performed using the input component that is discussed below. The additional control operation is, for example, a confirmation operation for confirming activation of the first driving function as proposed by the system after the driving parameter has reached the permissibility range, for example, by actuating a control element or by letting go of a steering wheel (which preferably comprises a hands-on sensor system).

The concept according to the present subject matter affords a considerable gain in convenience and reduces control effort: the second driving function can put the driving parameter into the permissibility range, such that the first driving function is able to be activated.

It is advantageous if a control operation by the driver for activating the first driving function puts the vehicle into a state, via the second driving function, in which the first driving function can be activated, for example, automatically without a further control operation or only after a further control operation, for example, for confirming the activation.

The driving function to this end has a user interface that comprises an input component for a control operation by the driver for activating the first driving function, for example, an actuable control element (a control button) for activating the first driving function. The input component may also be a voice recognition system that receives a corresponding voice command for activating the first driving function.

The input component does not have to be just an input component designed to activate the first driving function. Instead, it would be conceivable for the input component to be a joint input component for a plurality of driving functions for automated driving, a joint control element (for example a button). The plurality of driving functions comprises the first driving function (for example HAF) and the second driving function (for example TAF), and provision is preferably furthermore made for one or more further driving functions (for example ACC and/or a lane keep assistant without longitudinal guidance). In the case of a joint input component for a plurality of driving functions, a control operation via the input component signals to the system the driver's general desire for automated driving, without a direct reference to the first driving function. The driving system is then configured, after establishing the desired signal via the input component for automated driving, to activate that available driving function from the plurality of driving functions that has the highest possible degree of automation. Such a control concept having a joint control element is described in German patent application 102017208506.1 entitled "Fahrsystem mit verschiedenen Fahrfunktionen zum automatisierten Fahren and einem gemeinsamen Bedienelement sowie Verfahren zum Aktivieren einer Fahrfunktion über das gemeinsame Bedienelement" [Driving system with different driving functions for automated driving and a joint control element, and method for activating a driving function using the joint control element], filed on May 19, 2017 by the same applicant. This control concept with a joint control element is hereby incorporated into the disclosure content of this application by reference.

The driving system is configured such that, starting from a driving state without an active first and without an active second driving function (in particular starting from a manual driving mode) and a value of the driving parameter outside the permissibility range, to establish a control operation, performed via the input component, for activating the first driving function.

After establishing the control operation for activating the first driving function, the second driving function is activated by the system. The first driving function may initially not be activated, since the driving parameter is initially still outside the permissibility range for the first driving function. The activation of the second driving function may take place under the proviso that a driving parameter (for example the vehicle speed) is in an optional permissibility range for the second driving function. This permissibility range for the second driving function (for example 40 km/h to 210 km/h) is—if it is present at all—generally greater than the permissibility range (for example 60 km/h to 130 km/h) for the first driving function for the same driving parameter (for example for the driving speed) and often comprises the permissibility range for the first driving function.

The second driving function is preferably activated automatically without the need for a further control operation. It would however be conceivable for a further control operation to be required to activate the second driving function, in particular the activation of the second driving function has to be confirmed by the driver, since the driver possibly expects immediate activation of the first driving function.

Starting from the driving state with an active second driving function and a value of the driving parameter outside the permissibility range, when the second driving function is active, the value of the driving parameter is changed in the direction of the permissibility range by way of automated longitudinal guidance or by way of automated transverse guidance, as has already been described above. The first driving function is activated or the activatability thereof is signaled to the driver after it has been established that the driving parameter meets the criterion, as has already been described above.

The first driving function is available, for example, in a permissibility range for the speed, defined by a lower (for example 60 km/h) and/or upper speed limit (for example 130 km/h). The driving system is then preferably configured such that, starting from a driving state with an active second driving function and a vehicle speed above the upper speed limit (for example 130 km/h), when the second driving function is active, to reduce the vehicle speed to the upper speed limit or to reduce it to a value below the upper speed limit. As an alternative or in addition, the driving system is configured such that, starting from a driving state with an active second driving function and a vehicle speed below the lower speed limit (for example 60 km/h), when the second driving function is active, to increase the vehicle speed to the lower speed limit or to increase it to a value above the lower speed limit.

A set speed is preferably able to be specified by the driver for the vehicle speed at least for the second driving function. By way of example, for this purpose a manually actuable control means or a control means able to be controlled through voice or through gestures for (in particular incrementally) increasing and reducing the set speed is provided and, for example, incrementally increases or reduces the set speed by a specific value (for example 10 km/h) upon each individual control input and/or upon continuous actuation. A manually actuable control element for adopting the (legally) permitted maximum speed on the road section as set speed may also, for example, be provided for this purpose.

The set speed is preferably set by the system to the upper speed limit or to a value below the upper speed limit in order to reduce the vehicle speed, preferably without a further control operation from the driver being required for this purpose. The new setting of the set speed may take place under the proviso that the driver consents to a new setting for the set speed as proposed by the system.

The set speed may be set by the system to the lower speed limit or to a value above the lower speed limit by the system in order to increase the vehicle speed.

If, for example, the vehicle is driving too fast (for example 140 km/h in the case of an upper limit for activatability of 130 km/h) to be able to activate HAF, the control operation by the driver for activating HAF leads to the vehicle changing to the partly automated driving mode (TAF), if it is not already in this driving mode in any case. In this state, the set speed is set to a speed (for example 130 km/h) in the permissibility range (in particular to the maximum speed of the permissibility range), such that the vehicle slows down to this set speed. As soon as the set speed is reached, HAF is preferably activated and the responsibility for the vehicle guidance passes to the vehicle.

There may also be provision, starting from a driving state with an active second driving function (for example TAF) and a value of the driving parameter outside the permissibility range for the first driving function, for a control operation for activating the first driving function to lead to the set speed being set automatically to a value in the permissibility range in order to adjust the vehicle speed. In this case, the vehicle speed is adapted automatically by the second driving function such that the first driving function is able to be activated when the permissibility range is reached.

The driving parameter may also be the distance of the vehicle from the vehicle in front in terms of time or length. In this case, the first driving function is preferably available in a permissibility range for the distance, defined by a lower distance limit (for example 3 s). The driving system is configured such that, starting from a driving state with an active second driving function and a distance below the lower distance limit, when the second driving function is active, to increase the distance to the lower distance limit or a value above the lower distance limit.

By way of example, the distance from the vehicle in front is too low to be able to activate HAF. A control operation for activating HAF initially leads to the activation of TAF, the distance is automatically increased and—when this distance is great enough, in particular greater than or greater than or equal to a threshold value for the distance—HAF is activated.

By way of example, a time or length-based setpoint distance from the vehicle in front is set by the system to the lower limit of the permissibility range or to a value greater than the lower limit in response to a control operation for activating the first driving function. There may be provision for a setpoint distance from the vehicle in front to be able to be set generally by control means; in the case of the system setting the setpoint distance, the setpoint distance that is set by the driver is modified.

The first driving function is preferably a driving function without the driver being responsible for continuously monitoring the driving function; this is the case, for example, with highly automated driving. The second driving function is preferably a driving function with the driver being responsible for continuously monitoring the driving function, for example, partly automated driving (TAF) with automated longitudinal and transverse guidance, wherein the driver must continuously monitor the TAF driving function.

In this case, the driving system preferably has such a user interface that comprises an output component (for example a display) that is used to signal to the driver whether the driver is responsible for continuously monitoring the active driving function. It is possible to show to the driver, through one or more clear displays, whether the driver or the vehicle is currently responsible. This may take place, for example, through a text or voice output: "you have taken responsibility" or "you have taken over driving". The active driving mode that links the driver to taking or ceding responsibility may be identified, for example, by a symbol, a characteristic color, or graphic changes on a display, such as the instrument panel.

Only the availability of the first driving function depending on the value of a driving parameter has been discussed above. The availability of the first driving function however often depends on the respective value of various driving parameters, for example, whether the driving speed is in a particular speed range (first permissibility range) and whether the distance from the vehicle in front is greater than or greater than or equal to a threshold value (second permissibility range). The availability may possibly also depend on the value of one or more further driving parameters (for example the transverse position in the traffic lane).

If the availability is dependent on at least two driving parameters, the first driving function is available, for example, when the driving parameter is in the permissibility range of this driving parameter and—at the same time—a different second driving parameter is in a second permissibility range of the second driving parameter.

The driving function is then configured such that, in the event that a driving state is present in which, when the second driving function is active, the value of the (first) driving parameter is outside the (first) permissibility range and the value of the second driving parameter is outside the second permissibility range, to change the value of the (first) driving parameter in the direction of the (first) permissibility range and to change the value of the second driving parameter in the direction of the second permissibility range by way of the active second driving function.

After the driving parameter is in the permissibility range and the second driving parameter is in the second permissibility range, the first driving function may then be activated automatically, or the activatability thereof may be signaled to the driver.

After establishing the control operation by the driver for activating the first driving function, the first driving parameter may, for example, initially be changed by the second driving function and—only after the permissibility range for the first driving parameter is reached—the second driving parameter may be changed. As an alternative, both driving parameters may also be changed in the direction of the respective permissibility ranges at the same time.

The present subject matter relates to a method for activating a first driving function for automated driving with automated longitudinal and transverse guidance, wherein a first driving function for automated driving with automated longitudinal and transverse guidance and a second driving function for automated driving with at least automated longitudinal guidance or with at least automated transverse guidance and a lower degree of automation than the first driving function are present. The first driving function is available for activation in a permissibility range of a driving parameter. The method comprises the steps of:

starting from a driving state with an active second driving function and a value of the driving parameter outside the permissibility range, changing the value of the driving parameter, when the second driving function is active, in the direction of the permissibility range by way of automated longitudinal guidance or by way of automated transverse guidance;

establishing that the driving parameter meets a criterion with respect to the permissibility range; and activating the first driving function or signaling the activatability thereof after it has been established that the driving parameter meets the criterion.

The above explanations regarding the driving system according to the present subject matter also apply analogously to the method according to the present subject matter. Advantageous example embodiments of the method according to the present subject matter that are not described explicitly here and in the claims correspond to the advantageous example embodiments of the driving system according to the present subject matter that are described above or described in the patent claims.

The present subject matter relates to software containing program code and/or instructions for performing the method according to the present subject matter when the software executes on a computer, distributed computers, controller, electronic control unit, processor, or the like. The computer or the distributed computers are in this case part of the driving system. The computer or the computers is or are, for example, distributed over one or more controllers.

DETAILED DESCRIPTION OF THE DRAWINGS

Starting from a driving state with manual driving mode, at the time to, a control operation for activating the HAF driving function is established by the driving system, for example, the actuation of a button designed to activate the HAF driving function is established. The driving system then checks whether the vehicle speed $v_{ist}$ is in a permissibility range for activating the HAF driving function. The upper limit $v_{HAF,max}$ of the permissibility range is, for example, 130 km/h.

Figure 1:
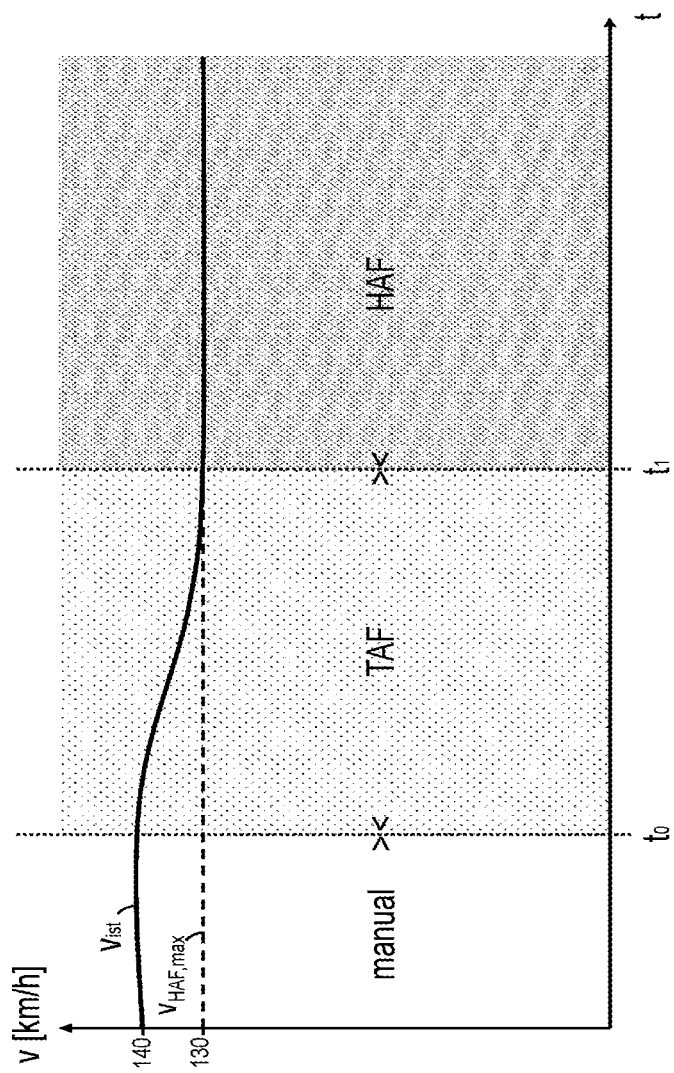
FIG. 1 shows an example activation of the HAF driving function after reducing the speed using the TAF driving function.

In the case of FIG. 1, at the time t0, the current vehicle speed $v_{ist}$ is above the upper limit $v_{HAF,max}$ of the permissibility range, such that the HAF driving function is not able to be activated immediately. Instead, the TAF driving function is activated by the system in response to the control operation for activating the HAF driving function; activation of the TAF driving function is permitted at this speed.

In the driving state with active TAF driving function, the vehicle speed $v_{ist}$ is automatically reduced in the direction of the upper limit $v_{HAF,max}$ of the permissibility range for the HAF driving function by way of automated longitudinal guidance. In order to reduce the vehicle speed $v_{ist}$, a set speed $v_{setz}$ (in the form of a setpoint speed for the speed controller) has been set to $v_{setz}=v_{HAF,max}$ by the system, for example. If the vehicle establishes that the vehicle speed $v_{ist}$ has reached the upper limit $v_{HAF,max}$ of the permissibility range for the HAF driving function, the HAF driving function is activated by the system at the time $t_1$. The activation of the HAF driving function by the system may take place under the proviso that the driver consents to the activation by way of a previous confirmation operation.

It has been assumed above that a manual driving mode is present prior to the time t0. If, however, the TAF driving function is already active prior to the time t0, the driver may perform a control operation for activating the HAF driving function, in response to which the set speed $v_{setz}$ is set to the upper limit $v_{HAF,max}$ of the permissibility range for the HAF driving function for the TAF driving function that is already active in any case. In response thereto, the vehicle speed is automatically reduced to the value $v_{HAF,max}$ via the second driving function, such that the HAF driving function is activated by the system when $v_{HAF,max}$ is reached. The activation of the HAF driving function by the system may take place under the proviso that the driver consents to the activation by way of a previous confirmation operation.

Figure 2:
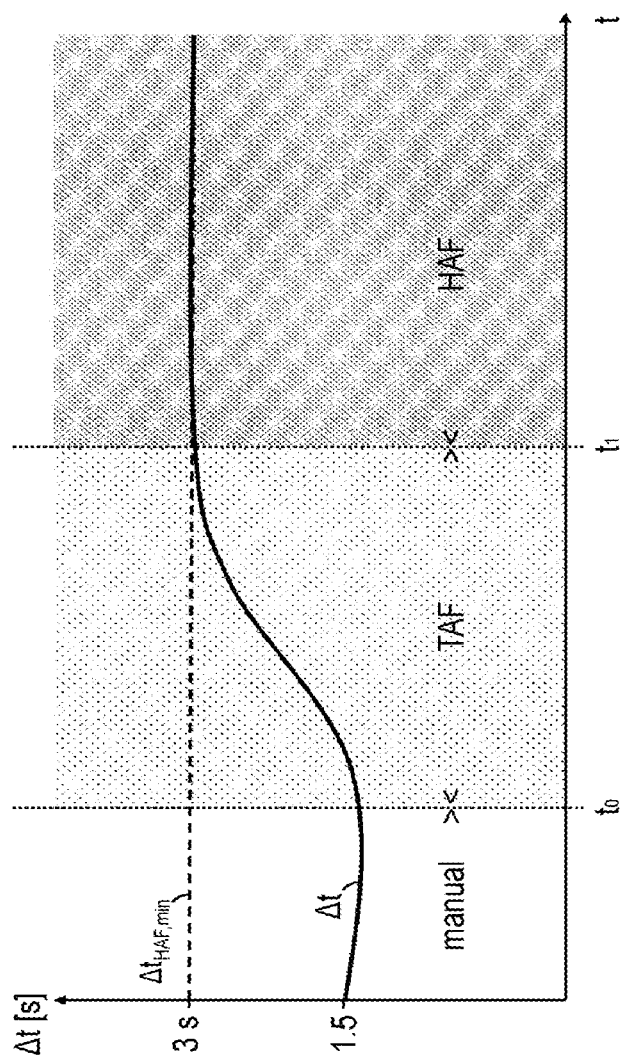
FIG. 2 shows an example activation of the HAF driving function after increasing the temporal distance from the vehicle in front using the TAF driving function.

FIG. 2 shows an example activation of the HAF driving function after increasing the temporal distance Δt from the vehicle in front using the TAF driving function.

Starting from a driving state with manual driving mode, at the time t0, a control operation for activating the HAF driving function is established by the driving system, for example, the actuation of a button designed to activate the HAF driving function is established. The driving system then checks whether the temporal distance Δt from the vehicle in front is in a distance permissibility range for activating the HAF driving function. The distance permissibility range has a lower limit $\Delta t_{HAF,min}$. An upper limit is not defined here for the distance permissibility range. The lower limit $\Delta t_{HAF,min}$ of the distance permissibility range is, for example, 3 seconds.

In the case of FIG. 2, at the time t0, the distance Δt from the vehicle in front is below the lower limit $\Delta t_{HAF,min}$ of the distance permissibility range, such that the HAF driving function is not able to be activated immediately. Instead, the TAF driving function is activated by the system in response to the control operation for activating the HAF driving function.

In the driving state with an active TAF driving function, the distance Δt from the vehicle in front is automatically increased in the direction of the lower limit $\Delta t_{HAF,min}$ of the distance permissibility range for the HAF driving function by way of automated longitudinal guidance. A setpoint distance is set to $\Delta t_{HAF,min}$ by the system in order to increase the distance Δt, for example. If the vehicle establishes that the vehicle speed $v_{ist}$ has reached the lower limit $\Delta t_{HAF,min}$ of the distance permissibility range for the HAF driving function, the HAF driving function is activated by the system at the time $t_1$. The activation of the HAF driving function by the system may take place under the proviso that the driver consents to the activation by way of a previous confirmation operation.

Figure 3:
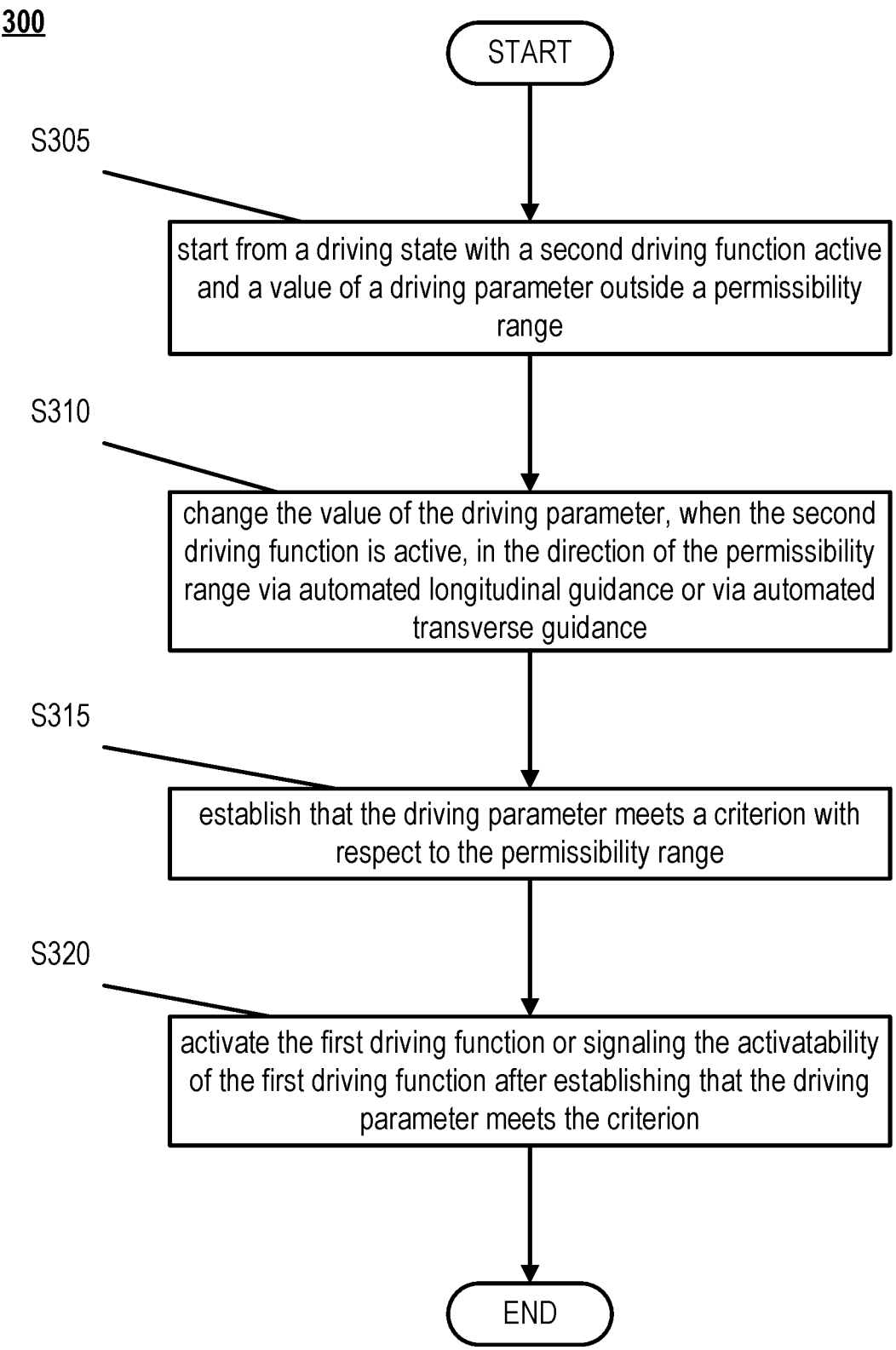
FIG. 3 shows a flow diagram of an example process to be performed by an electronic control unit for a driving system.

FIG. 3 shows a flow diagram of an example process 300 to be performed by an electronic control unit for a driving system. The process 300 may include (S305) starting from the driving state with an active second driving function and a value of the driving parameter outside the permissibility range. The process 300 may further include (S310) changing the value of the driving parameter, when the second driving function is active, in the direction of the permissibility range via automated longitudinal guidance or via automated transverse guidance. The process 300 may further include (S315) establishing that the driving parameter meets a criterion with respect to the permissibility range. The process 300 may further include (S320) activating the first driving function or signaling the activatability of the first driving function after establishing that the driving parameter meets the criterion.

Figure 4:
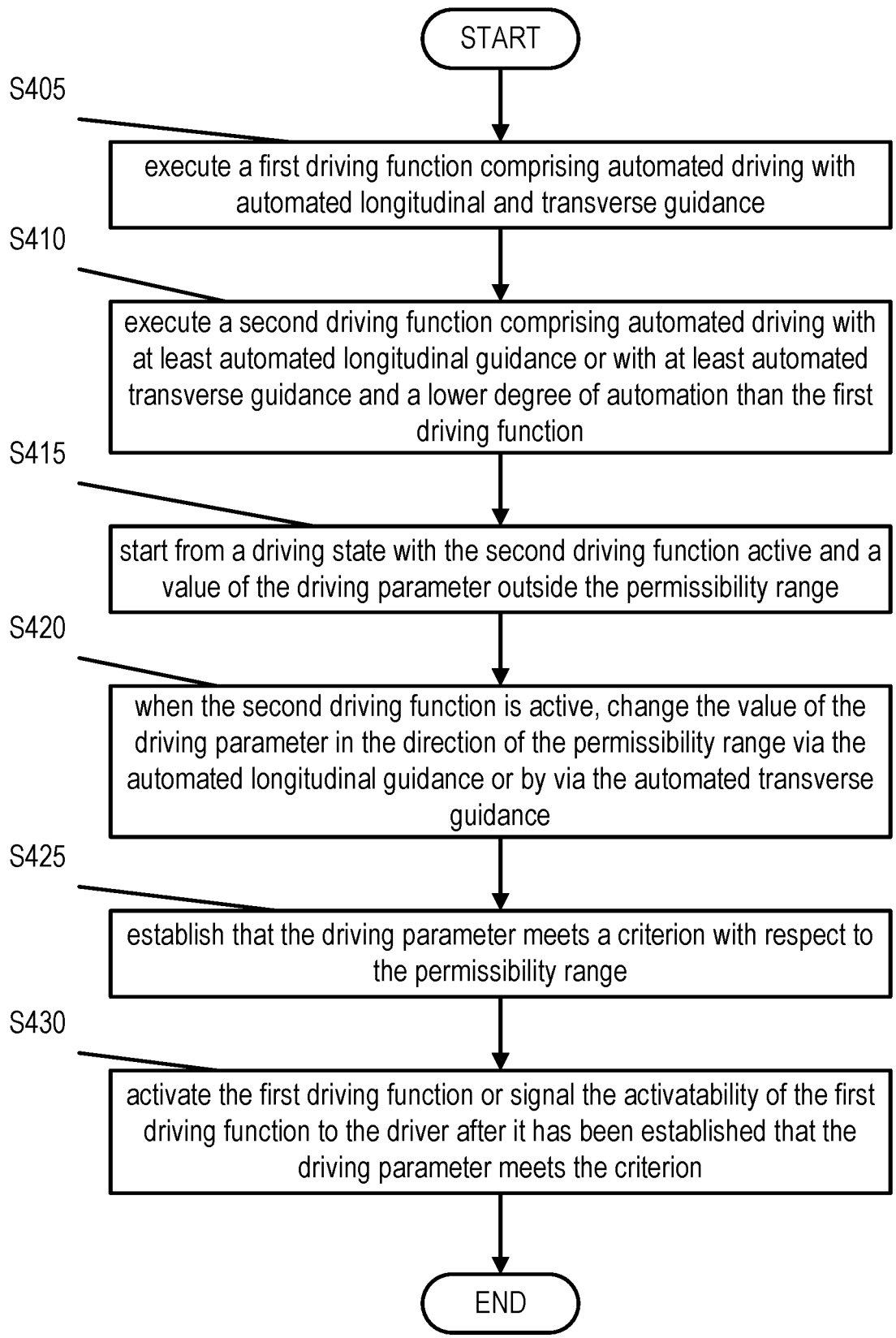
FIG. 4 shows a flow diagram of an example method for activating a first driving function.

FIG. 4 shows a flow diagram of an example method for activating a first driving function. The method 400 may include (S405) executing a first driving function comprising automated driving with automated longitudinal and transverse guidance. The method 400 may further include (S410) executing a second driving function comprising automated driving with at least automated longitudinal guidance or with at least automated transverse guidance and a lower degree of automation than the first driving function. The method 400 may further include (S415) starting from a driving state with the second driving function active and a value of the driving parameter outside the permissibility range. The method 400 may further include (S420) when the second driving function is active, changing the value of the driving parameter in the direction of the permissibility range via the automated longitudinal guidance or by via the automated transverse guidance. The method 400 may further include (S425) establishing that the driving parameter meets a criterion with respect to the permissibility range. The method 400 may further include (S430) activating the first driving function or signal the activatability of the first driving function to the driver after it has been established that the driving parameter meets the criterion.

What is claimed is:

1. A driving system for a motor vehicle, comprising:
   an electronic control unit;
   a memory in communication with the electronic control unit, the memory storing a plurality of instructions executable by the electronic control unit to cause the driving system to:
   execute a first driving function comprising automated driving with automated longitudinal and transverse guidance;
   execute a second driving function comprising automated driving with at least automated longitudinal guidance or with at least automated transverse guidance and a lower degree of automation than the first driving function, wherein
   the first driving function is available in a permissibility range of a driving parameter;
   start from a driving state with the second driving function active and a value of the driving parameter outside the permissibility range;
   when the second driving function is active, change the value of the driving parameter in the direction of the permissibility range via the automated longitudinal guidance or by via the automated transverse guidance;

establish that the driving parameter meets a criterion with respect to the permissibility range; and activate the first driving function or signal the activatability of the first driving function to a driver after it has been established that the driving parameter meets the criterion.

2. The driving system according to claim 1, wherein the criterion is reaching the permissibility range.

3. The driving system according to claim 1, further comprising:
a user interface, comprising:
an input component for a control operation by the driver for activating the first driving function; and
the memory further includes instructions executable by the electronic control unit to cause the driving system to:
start from a driving state, with the first and the second driving functions inactive and a value of the driving parameter outside the permissibility range, to establish a control operation by the driver for activating the first driving function;
activate the second driving function after establishing the control operation for activating the first driving function;
start from the driving state with the second driving function active and a value of the driving parameter outside the permissibility range;
when the second driving function is active, change the value of the driving parameter in the direction of the permissibility range via the automated longitudinal guidance or via the automated transverse guidance; and
activate the first driving function or signal the activatability of the first driving function to the driver after it has been established that the driving parameter meets the criterion.

4. The driving system according to claim 1, wherein the first driving function is a driving function for highly automated driving; and
the second driving function is a driving function for partly automated driving with longitudinal and transverse guidance or for assisted driving with longitudinal guidance or for assisted driving with transverse guidance.

5. The driving system according to claim 1, wherein the driving parameter relates to:
a speed of the vehicle;
a distance of the vehicle from the vehicle in front; or
a transverse position of the vehicle in a traffic lane.

6. The driving system according to claim 1, wherein the driving parameter is a speed of a vehicle;
the first driving function is available in a permissibility range for the speed, defined by a lower and/or upper speed limit; and
the memory further includes instructions executable by the electronic control unit to cause the driving system to:
start from a driving state, with the second driving function active and the speed of the vehicle above the upper speed limit, and
reduce the speed of the vehicle to the upper speed limit, or
reduce the speed of the vehicle to a value below the upper speed limit; and/or
start from a driving state, with the second driving function active and the speed of the vehicle below the lower speed limit, and
increase the speed of the vehicle to the lower speed limit, or
increase the speed of the vehicle to a value above the lower speed limit.

7. The driving system according to claim 6, wherein a set speed for the speed of the vehicle can be specified by the driver at least for the second driving function; and
the memory further includes instructions executable by the electronic control unit to cause the driving system to:
set the set speed to the upper speed limit or the value below the upper speed limit to reduce the vehicle speed; and/or
set the set speed to the lower speed limit or the value above the lower speed limit to increase the vehicle speed.

8. The driving system according to claim 1, wherein the driving parameter is a speed of the vehicle;
a set speed for the speed of the vehicle can be specified by the driver at least for the second driving function, wherein
the driving system further comprises:
a user interface, comprising:
an input component for a control operation by the driver for activating the first driving function; and
the memory further includes instructions executable by the electronic control unit to cause the driving system to:
start from a driving state, with second driving function active and a value of the speed of the vehicle outside the permissibility range, to establish a control operation by the driver for activating the first driving function; and
set the set speed to a value in the permissibility range in response thereto.

9. The driving system according to claim 1, wherein the driving parameter is a temporal distance or a length-based distance of the vehicle from the vehicle in front;
the first driving function is available in a permissibility range for the distance, defined by a lower distance limit; and
the memory further includes instructions executable by the electronic control unit to cause the system to:
start from a driving state with the second driving function active and a distance below the lower distance limit; and
when the second driving function is active, increase the distance to the lower distance limit or a value above the lower distance limit.

10. The driving system according to claim 1, wherein the first driving function does not signal to the driver to continuously monitor the driving function;
the second driving function signals to the driver to continuously monitor the driving function, wherein
the driving system further comprises:
a user interface, comprising:
an output component to signal to the driver whether or not the driver is currently responsible for continuously monitoring the active driving function.

11. The driving system according to claim 1, wherein the first driving function is available when the driving parameter is in the permissibility range of this driving parameter and a different second driving parameter is in a second permissibility range of the second driving parameter, and the memory further includes instructions executable by the electronic control unit to cause the driving system to:
start from a driving state with the second driving function active, a value of the driving parameter outside the permissibility range, and a value of the second driving parameter outside the second permissibility range;
when the second driving function is active:
change the value of the driving parameter in the direction of the permissibility range, and
change the value of the second driving parameter in the direction of the second permissibility range; and
activate the first driving function or signal the activatability of the first driving function to the driver after it has been established that:
the driving parameter is in the permissibility range, and
the second driving parameter is in the second permissibility range.

12. A method for activating a first driving function, comprising:
starting from a driving state with a second driving function active and a value of a driving parameter outside a permissibility range;
changing the value of the driving parameter, when the second driving function is active, in the direction of the permissibility range via automated longitudinal guidance or via automated transverse guidance;
establishing that the driving parameter meets a criterion with respect to the permissibility range; and
activating the first driving function or signaling the activatability of the first driving function after establishing that the driving parameter meets the criterion, wherein
the first driving function comprises automated driving with the automated longitudinal and the transverse guidance and is available in a permissibility range of the driving parameter; and
the second driving function comprises automated driving with at least the automated longitudinal guidance or with at least the automated transverse guidance and a lower degree of automation than the first driving function.

13. A non-transitory computer-readable medium comprising instructions operable, when executed by a computer or one or more distributed computing systems, to:
start from a driving state with a second driving function active and a value of a driving parameter outside a permissibility range;
change the value of the driving parameter, when the second driving function is active, in the direction of the permissibility range via automated longitudinal guidance or via automated transverse guidance;
establish that the driving parameter meets a criterion with respect to the permissibility range; and
activate a first driving function or signaling the activatability of the first driving function after establishing that the driving parameter meets the criterion, wherein
the first driving function comprises automated driving with automated longitudinal and transverse guidance and is available in a permissibility range of the driving parameter; and
the second driving function comprises automated driving with at least automated longitudinal guidance or with at least automated transverse guidance and a lower degree of automation than the first driving function.

* * * * *